(12) United States Patent
O'Brien et al.

(10) Patent No.: US 8,060,744 B2
(45) Date of Patent: Nov. 15, 2011

(54) COMPUTER ARCHITECTURE FOR AN ELECTRONIC DEVICE PROVIDING SINGLE-LEVEL SECURE ACCESS TO MULTI-LEVEL SECURE FILE SYSTEM

(75) Inventors: Terence W. O'Brien, Webster, NY (US); Richard Schmalbach, Timonium, MD (US); John Blessing, Eldersburg, MD (US); Jeffrey Murray, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 1033 days.

(21) Appl. No.: 11/387,991

(22) Filed: Mar. 23, 2006

(65) Prior Publication Data
US 2007/0226494 A1 Sep. 27, 2007

(51) Int. Cl.
*H04L 29/00* (2006.01)
(52) U.S. Cl. .................. 713/166; 713/189; 713/193
(58) Field of Classification Search .......... 713/26, 713/189, 193
See application file for complete search history.

(56) References Cited

U.S. PATENT DOCUMENTS

| | | | |
|---|---|---|---|
| 4,227,253 A | 10/1980 | Ehrsam et al. | |
| 4,493,031 A | 1/1985 | Silverio | |
| 4,918,728 A * | 4/1990 | Matyas et al. | 380/280 |
| 5,263,168 A | 11/1993 | Toms et al. | |
| 5,283,828 A * | 2/1994 | Saunders et al. | 713/192 |
| 5,369,702 A | 11/1994 | Shanton | |
| 5,548,646 A | 8/1996 | Aziz et al. | |
| 5,596,718 A * | 1/1997 | Boebert et al. | 726/16 |
| 5,748,744 A | 5/1998 | Levy et al. | |
| 5,802,178 A * | 9/1998 | Holden et al. | 713/151 |
| 5,887,064 A | 3/1999 | Seysen | |
| 5,956,404 A | 9/1999 | Schneier et al. | |
| 6,081,895 A * | 6/2000 | Harrison et al. | 713/189 |
| 6,092,202 A | 7/2000 | Veil et al. | |
| 6,148,401 A | 11/2000 | Devanbu et al. | |

(Continued)

FOREIGN PATENT DOCUMENTS
DE 19633919 C1 6/1997
(Continued)

OTHER PUBLICATIONS

Wiki: "Multilevel Security" Wikipedia, [online] Mar. 21, 2006, XP002446615 Internet. Retrieved from the Internet: URL:http://en.wikipedia.org/w/index.php?title=Multilevel_security&oldid=44733265> [retreived on Aug. 13, 2007].

(Continued)

*Primary Examiner* — Nasser Moazzami
*Assistant Examiner* — Ghazal Shehni
(74) *Attorney, Agent, or Firm* — Fox Rothschild, LLP; Robert J. Sacco (57) ABSTRACT

Method for providing a single level secure (SLS) user processor (402, 502) with access to a multi-level secure (MLS) file system (300). The method begins by authenticating a user to a cryptographic processor (302) by communicating one or more types of user authentication information to the cryptographic processor. Based on such authentication, the MLS file system services are provided such that the SLS user processor (402, 502) has access to files (306, 308, 310, 312, 314) at only one defined security classification level at a time. The method also includes zeroizing one or more data stores used by the SLS user processor each time the SLS user processor transitions between accessing classified data files at a first security classification level and a second security classification level.

35 Claims, 5 Drawing Sheets

U.S. PATENT DOCUMENTS

| | | | |
|---|---|---|---|
| 6,282,653 | B1 | 8/2001 | Berstis et al. |
| 6,351,817 | B1 | 2/2002 | Flyntz |
| 6,378,071 | B1 * | 4/2002 | Sasaki et al. ............... 713/165 |
| 6,378,072 | B1 * | 4/2002 | Collins et al. ............... 713/187 |
| 6,671,804 | B1 | 12/2003 | Kent |
| 6,775,778 | B1 | 8/2004 | Laczko, Sr. et al. |
| 7,003,674 | B1 | 2/2006 | Hamlin |
| 7,028,149 | B2 | 4/2006 | Grawrock et al. |
| 7,069,447 | B1 | 6/2006 | Corder |
| 7,072,937 | B2 | 7/2006 | Neebe et al. |
| 7,302,698 | B1 | 11/2007 | Proudler et al. |
| 7,322,042 | B2 | 1/2008 | Srinivasan et al. |
| 7,380,275 | B2 | 5/2008 | Srinivasan et al. |
| 7,392,398 | B1 * | 6/2008 | Shakkarwar ............... 713/189 |
| 7,543,144 | B2 * | 6/2009 | Rensin et al. ............... 713/164 |
| 7,698,552 | B2 | 4/2010 | Wilson et al. |
| 7,765,399 | B2 | 7/2010 | O'Brien |
| 7,779,252 | B2 | 8/2010 | O'Brien et al. |
| 7,818,574 | B2 | 10/2010 | Fayad et al. |
| 7,979,714 | B2 | 7/2011 | Borsa et al. |
| 2001/0044886 | A1 | 11/2001 | Cassagnol et al. |
| 2002/0059238 | A1 * | 5/2002 | Saito ............... 707/9 |
| 2002/0099950 | A1 | 7/2002 | Smith |
| 2003/0046589 | A1 * | 3/2003 | Gregg ............... 713/201 |
| 2003/0126434 | A1 | 7/2003 | Lim et al. |
| 2003/0163740 | A1 | 8/2003 | Thjai et al. |
| 2003/0204801 | A1 | 10/2003 | Tkacik et al. |
| 2004/0039924 | A1 | 2/2004 | Baldwin et al. |
| 2004/0044902 | A1 | 3/2004 | Luthi |
| 2004/0103288 | A1 | 5/2004 | Ziv et al. |
| 2005/0055524 | A1 | 3/2005 | Gulick et al. |
| 2005/0114687 | A1 | 5/2005 | Zimmer et al. |
| 2005/0132186 | A1 | 6/2005 | Khan et al. |
| 2006/0021007 | A1 * | 1/2006 | Rensin et al. ............... 726/2 |
| 2006/0041755 | A1 | 2/2006 | Pemmaraju |
| 2006/0078109 | A1 | 4/2006 | Akashika et al. |
| 2006/0105740 | A1 | 5/2006 | Puranik |
| 2006/0195907 | A1 | 8/2006 | Delfs et al. |
| 2006/0248599 | A1 | 11/2006 | Sack et al. |
| 2006/0251258 | A1 | 11/2006 | Lillie et al. |
| 2006/0253711 | A1 | 11/2006 | Kallmann |
| 2007/0214364 | A1 | 9/2007 | Roberts |
| 2007/0226493 | A1 | 9/2007 | O'Brien et al. |
| 2007/0226517 | A1 | 9/2007 | O'Brien et al. |
| 2007/0250411 | A1 | 10/2007 | Williams |
| 2007/0283159 | A1 | 12/2007 | Borsa et al. |
| 2008/0022136 | A1 * | 1/2008 | Mattsson et al. ............... 713/194 |
| 2009/0150899 | A1 | 6/2009 | Tahan |

FOREIGN PATENT DOCUMENTS

| | | | |
|---|---|---|---|
| EP | 0 471 538 | | 2/1992 |
| EP | 0657820 A1 | | 6/1995 |
| EP | 1 085 396 | | 3/2001 |
| GB | 2336005 A | | 10/1999 |
| WO | WO 98/39876 | * | 3/1998 |

OTHER PUBLICATIONS

Wiki: "Multilevel Security" Wikipedia, [Online] Mar. 21, 2006, XP00246615 Internet Retrieved from the Internet: <URL:http://en.wikiedia.org/w/index.php?title=Multilevel_security &oldid=44733265>> [retrieved on Aug. 13, 2007].

Schneier, Applied Cryptography Second Edition, 1996, John Wiley & Sons, Second Edition, pp. 513-514.

U.S. Appl. No. 11/359,224, filed Feb. 22, 2006, Computer Architecture for a Handheld Electronic Device.

U.S. Appl. No. 11/385,063, filed Mar. 21, 2006, Computer Architecture for a Handheld Electronic Device with a Shared Human-Machine Interface.

U.S. Appl. No. 11/387,342, filed Mar. 23, 2006, Computer Architecture for an Electronic Device Providing a Secure File System.

U.S. Appl. No. 11/387,991, filed Mar. 23, 2006, Computer Architecture for an Electronic Device Providing Single-Level Secure Access to Multi-Level Secure File System.

U.S. Appl. No. 11/387,744, filed Mar. 23, 2006 Computer Architecture for an Electronic Device Providing SLS Access to MLS.

U.S. Appl. No. 11/445,571, filed Jun. 2, 2006, Authentication and Access Control Device.

Extended European Search Report mailed Jul. 13, 2011; Application Serial No. 11003076.4-2212 in the name of Harris Corporation.

Meadows C Ed—Institute of Electrical and Electronics Engineers: "Extending the Brewer-Nash model to a multilevel context", Proceedings of the Symposium on Research in Security and Privacy. Oakland, May 7-9, 1990; [Proceedings of the Symposium on Research in Security and Privacy],Los Alamitos, IEEE Comp. Soc. Press, US, vol. SYMP. 11, May 7, 1990, pp. 95-102, XP010020190, DOI: D0I:10.1109/RISP.1990.63842 ISBN: 978-0-8186-2060-7.

Brewer D F C et al: "The Chinese Wall security policy", Proceedings of the Symposium on Security and Privacy. Oakland, May 1-3, 1989; [Proceedings of the Symposium on Security and Privacy], Washington, IEEE Comp. Soc. Press, US, vol.-, May 1, 1989, pp. 206-214, XP010016022, DOI: D0I:10.1109/SECPRI.1989.36295 ISBN: 978-0-8186-1939-7.

Fraser T: "LOMAC: Low Water-Mark integrity protection for COTS environments", Security and Privacy, 2000. S&P 2000. Proceedings. 2000 IEEE Symposium on Berkeley, CA, USA May 14-17, 2000, Los Alamitos, CA, USA,IEEE Comput. Soc, US, May 14, 2000, pp. 230-245, XP010501138, DOI:DOI:10.1109/SECPRI.2000.848460 ISBN: 978-0-7695-0665-4.

* cited by examiner

(Prior Art)

COMPUTER ARCHITECTURE FOR AN ELECTRONIC DEVICE PROVIDING SINGLE-LEVEL SECURE ACCESS TO MULTI-LEVEL SECURE FILE SYSTEM

BACKGROUND OF THE INVENTION

1. Statement of the Technical Field

The inventive arrangements relate to electronic devices for storing and accessing sensitive/classified data.

2. Description of the Related Art

Electronic computers have the ability to store and process data. Computers typically include some kind of microprocessor with a commercially available operating system such as Linux, Unix, or Microsoft Windows. Many computers also have displays and keyboards for the human/machine interface. The foregoing capabilities make these devices highly useful for a various business and personal applications.

Currently, there exist a wide variety of computing devices with conventional operating systems and architectures. These commercially available computers with commercial-off-the-shelf (COTS) operating systems and COTS application programs generally satisfy the processing and data storage requirements of most users. For example, they include applications for word processing, data storage, spreadsheets, time management, and contact management. These applications generally function quite well and have interfaces that are familiar to many users.

Some commercially available computing devices and/or software applications incorporate various security measures in an effort to protect data which is stored or processed using the device. For example, encryption technology and password protection features are known in the art. Still, this level of security can be inadequate for managing information that is of a Confidential, Secret, or Top Secret nature, particularly when such information relates to matters of national security. For example, COTS operating systems and applications may not be sufficiently trustworthy for handling this type of information. Such programs can be susceptible to being compromised by various means including hacker attacks, viruses, worms, Trojan horses, and a wide variety of other means that are known to those skilled in the art.

Finally, notwithstanding the security limitations of COTS operating systems and applications, the basic architecture and interface systems of many commercial computing devices may leave these devices vulnerable to intrusion. For example, COTS devices do not employ trusted microprocessors, do not employ physical separation of classified and unclassified data processing, nor do they employ physical tamper detection and subsequent memory zeroization. Consequently, transport or processing of classified data using a commercial computer is not generally permitted.

Trusted operating systems and applications are generally designed to more rigorously address the problem of computer security. Trusted operating systems undergo evaluation of their overall design, verification of the integrity and reliability of their source code, and systematic, independent penetration evaluation. In contrast, non-trusted operating systems are generally not designed to an equally high level with regard to security precautions.

Single-level secure (SLS) is a class of systems that contain information with a single sensitivity (classification). SLS systems permit access by a user to data at a single sensitivity level without compromising data. Thus, SLS data file systems allow information at a single classification to be stored in an information system. The level of access can be limited by the current user security classification sign-on level and a security classification assigned to the secure user processor.

Multi-level secure (MLS) is a class of systems that contain information with different sensitivities (classifications). MLS systems permit simultaneous access by a user to data at multiple classification levels without compromising security. Thus, MLS data file systems allow information with different classifications to be stored in an information system. These systems are also designed to provide a user with the ability to process information in the same system. Significantly, however, these systems prevent a user from accessing information for which he is not cleared, does not have proper authorization, or does not have a need-to-know.

Users of non-trusted COTS operating systems, as may be found in commercial computers, are not generally allowed access to classified data found in secure file systems. Computers that utilize a trusted operating system (OS) which includes support for an SLS or MLS file system have been developed that are specifically designed to allow for storage of classified data. However, these devices are not generally designed to physically secure the data and zeroize the data upon tamper detection. Nor are they designed to be embedded as a secure component of a host computer system.

SUMMARY OF THE INVENTION

The invention concerns a method for providing a single level secure (SLS) user processor with multi-level secure (MLS) file system services. The method begins by authenticating a user to a cryptographic processor by communicating one or more types of user authentication information to the cryptographic processor. Based on such authentication, the MLS file system services are provided such that the SLS user processor has access to files at only one defined security classification level at a time. The method also includes zeroizing one or more data stores used by the SLS user processor each time the SLS user processor transitions between accessing classified data files at a first security classification level and a second security classification level.

According to one aspect of the invention, an MLS file services module can receives a request from an SLS user processor for a classified data file. In response to the request, a cryptographic processor associated with the MLS file services module accesses an MLS file system containing the classified data file. Thereafter the cryptographic processor decrypts the classified data file and the file is served to the SLS user processor in decrypted form.

The term "cryptographic processor" as used herein generally refers to a processor that is specifically designed to facilitate cryptographic processing. Such processors generally include one or more hardware based encryption services that facilitate the encryption and decryption of classified data files. For example, the hardware encryption services can include a hardware implemented cryptographic algorithm, a random number generator, and/or an exponentiator.

It should be understood that the method disclosed herein includes exclusively limiting concurrent access of the SLS user processor to files defined within a single security classification level within the MLS file system. This process is accomplished by utilizing a client zeroizer that is responsive to the cryptographic processor to automatically zeroize at least one data store used by the SLS user processor. According to one aspect of the invention, this zeroizing step is performed when the SLS user processor transitions between a first state in which it has access to the multi-level secure file system at a first security classification level, and a second state in which it has access to the multi-level secure file system at a second security classification level. The method also includes communicating the classified data file from the MLS file service module to the SLS user processor over a secure path.

The method also includes generating the request for the classified data file at a secure human/machine interface and communicating the request to the SLS user processor. The information contained in the classified data file is thereafter displayed to a user with the secure human/machine interface. When any necessary file operations are complete the classified data file is communicated from the SLS user processor to the MLS file services module. There, the cryptographic processor encrypts the classified data file. After encryption, the method continues by accessing the MLS file system with the cryptographic processor to store the classified data file.

The method can also include receiving at a MLS file service module a request from the SLS user processor for a non-encrypted unclassified data file. In response to such request, the MLS file services module accesses the MLS file system containing the unclassified data file. The unclassified data file is then served to the SLS user processor in plain-text form.

The method can further include selecting the cryptographic processor to include a trusted microprocessor and a trusted operating system executing on the trusted cryptographic processor. The SLS user processor can also be chosen so as to include trusted microprocessor hardware. According to one aspect of the invention, the SLS user processor can be selected so as to include a single level trusted operating system. Alternatively, the SLS user processor can be chosen so as to include an untrusted operating system.

The invention disclosed herein also includes a system for providing a secure file service. The basic building block of the system is an MLS file services module, which includes a cryptographic processor comprising suitable hardware and software for encrypting and decrypting a classified data file. The MLS file services module also includes an MLS file system hosted by the cryptographic processor. The MLS file system contains classified data files and is accessible exclusively to the cryptographic processor. The cryptographic processor is programmed so that it is responsive to a single level secure (SLS) user processor. The SLS user processor is distinct from the cryptographic processor. The SLS user processor includes suitable programming and communications hardware for requesting at least one classified data file from the MLS file service module that hosts the MLS file system. The cryptographic processor includes suitable cryptographic hardware and software to decrypt the classified data file. Once the file is decrypted by the cryptographic processor, the MLS file service module serves the classified data file to the SLS user processor in decrypted form. Depending on the configuration, the SLS user processor, the cryptographic processor, or both devices are provided with programming and data files as necessary for authenticating a user responsive to at least one user authentication information.

The cryptographic processor used in the system can exclusively limit the extent of MLS file access permitted to the SLS user processor. In particular, the cryptographic processor can limit the SLS user processor so that it can concurrently access files that are only within a single security classification level within the multi-level secure file system. The system can accomplish this by means of a client zeroizer that is responsive to the cryptographic processor. The client zeroizer is configured for automatically zeroizing at least one data store used by the SLS user processor.

According to one aspect of the invention, the cryptographic processor is programmed to cause the client zeroizer to automatically perform the zeroizing described herein under certain conditions. For example, the zeroizing can be performed when the SLS user processor transitions between a first state in which the SLS user processor has access to the multi-level secure file system at a first security classification level, and a second state in which the SLS user processor has access to the multi-level secure file system at a second security classification level.

The system provides a secure path defining a data communication link between the SLS user processor and the cryptographic processor. The system can also include a secure human/machine interface operatively connected to the SLS user processor. The secure human/machine interface is configured for communicating user commands to the SLS user processor and for displaying classified data files.

The SLS user processor described herein includes programming and communications hardware for communicating the classified data file from the SLS user processor to the cryptographic processor. The cryptographic processor includes necessary cryptographic hardware and software programming for encrypting the classified data file. The cryptographic processor is also programmed and includes suitable communication hardware for accessing the MLS file system for the purpose of storing the classified data file after encryption in the MLS file system.

The cryptographic processor can also include suitable programming and hardware so that it accesses the MLS file system responsive to a request from the SLS user processor for an unclassified data file. The MLS file service module can thereafter serve the unclassified data file to the SLS user processor.

According to one aspect of the invention, the cryptographic processor is comprised of a trusted microprocessor and a trusted operating system executing on the trusted cryptographic processor. The SLS user processor can also be comprised of trusted microprocessor hardware. According to one embodiment, the SLS user processor is comprised of a single level trusted operating system. Advantageously, however, the SLS user processor can instead be comprised of an untrusted operating system.

DETAILED DESCRIPTION OF THE PREFERRED EMBODIMENTS

Figure 1:
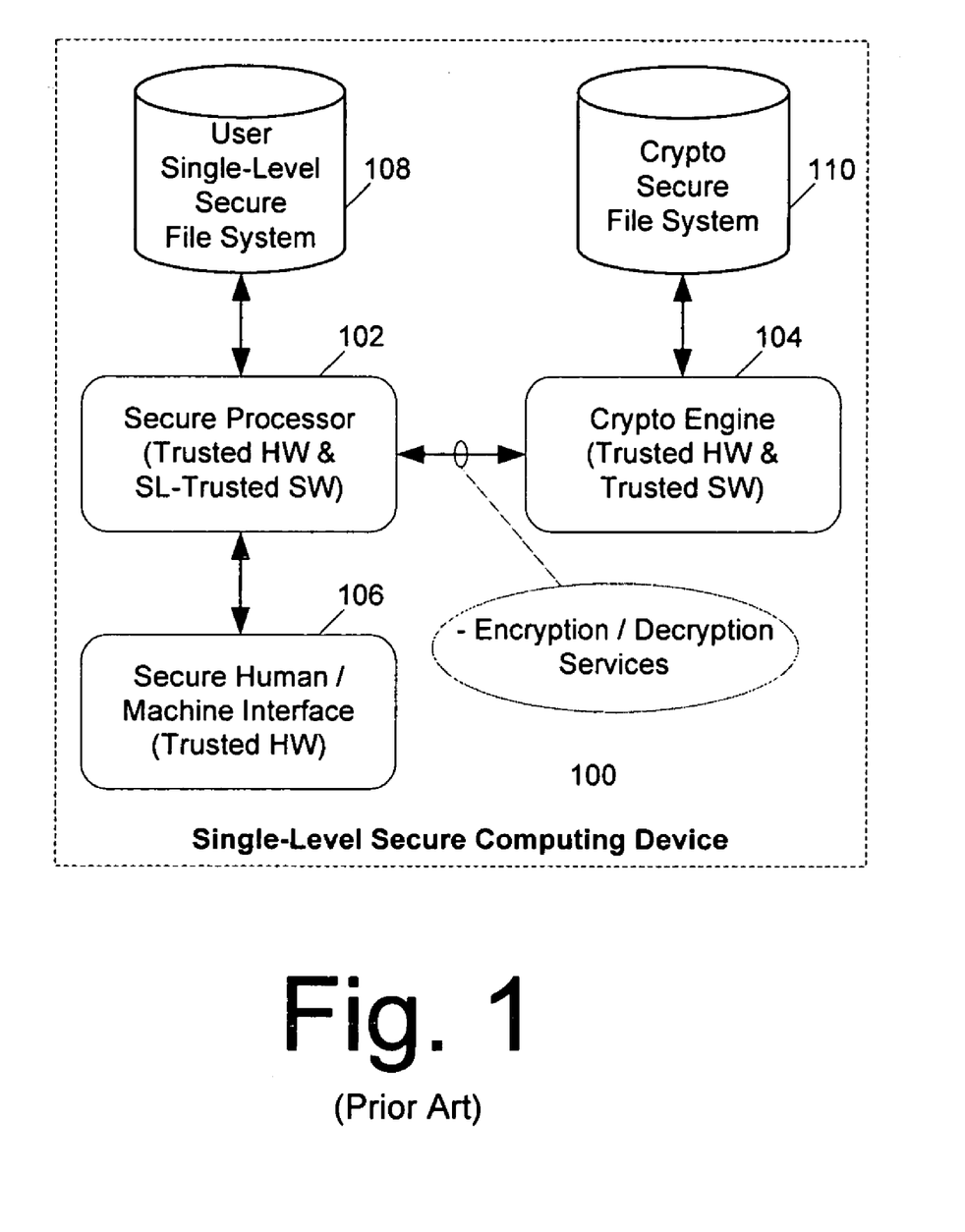
FIG. 1 is a block diagram of a single-level secure computing device of the prior art.

A block diagram of a single-level secure (SLS) computing device 100 is shown in FIG. 1. The SLS computing device 100 can include a secure user processor 102 that includes trusted hardware and single-level trusted software (operating system and application software). As used herein, the term "trusted" is used with reference to computer hardware, operating systems, and/or software applications that have been designed to ensure secure storage, processing and communication of data. Trusted hardware and trusted software can be combined to provide secure data processing. Trusted hardware and software are generally designed and tested to ensure the integrity and reliability of their source code, and their resistance to penetration. In contrast, non-trusted hardware and non-trusted software are generally not designed to an equally high level with regard to security precautions. Accordingly, when integrated into a computer system, those systems are often referred to as non-secure. Commercial-off-the-shelf (COTS) hardware and software is generally not "trusted."

The computing device 100 also includes a user SLS file system 108 in a data store that is used for storing user executable programs and data. Classified data stored in the SLS file system 108 is stored in an encrypted format. A cryptographic engine 104 is provided with trusted hardware and trusted software for providing encryption and decryption services. A crypto file system 110 is also maintained in a data store. The crypto file system 110 is used to store classified data and files used by the cryptographic engine 104. In contrast to the user SLS file system 108, user data and applications are not generally stored in the crypto file system 110. Instead, the crypto file system 110 generally contains cryptographic algorithms, security keys and certificates, audit data, policy profiles, and application data specific to the processing performed by the cryptographic engine 104.

A secure human/machine interface (HMI) 106 is also provided for the SLS computing device 100. The secure HMI 106 can be comprised of trusted hardware and can provide a trusted path to applications executing on secure user processor 102. Consequently, secure HMI 106 can prevent invasive or unauthorized applications from monitoring user inputs and system outputs. Secure HMI devices are known in the art and typically can include one or more features to ensure trusted communications between the user and the secure user processor. For example, the secure HMI 106 can provide a suitable interface by which a user can enter data and commands to the computing device 100. Secure HMI 106 can also include a user display for showing data and information processed by the computing device 100.

A user can request access to a classified data file using the secure HMI 106. Encrypted files in the user SLS files system 108 are accessed by the secure user processor 102 and provided to the cryptographic engine 104 for decryption. After the file has been decrypted, the cryptographic engine passes the decrypted file back to the secure user processor 102. Upon completion of any necessary user processing associated with the decrypted classified date file, the secure user processor 102 passes the file back to the cryptographic engine 104 for re-encryption. Thereafter, the encrypted file is returned to the secure user processor 102, which stores the file in the user SLS file system 108.

Notably, the secure user processor 102 can generally satisfy the security requirements for accessing the single-level secure file system 108. However, the operating system and applications can be expensive as compared to COTS systems. In particular, the secure user processor must be developed specifically to include trusted software for managing classified files, and especially for managing encryption and decryption services provided by the cryptographic processor. Another disadvantage of this arrangement is that the user single-level secure file system is not generally designed to physically secure the data and zeroize the data upon tamper detection.

Figure 2:
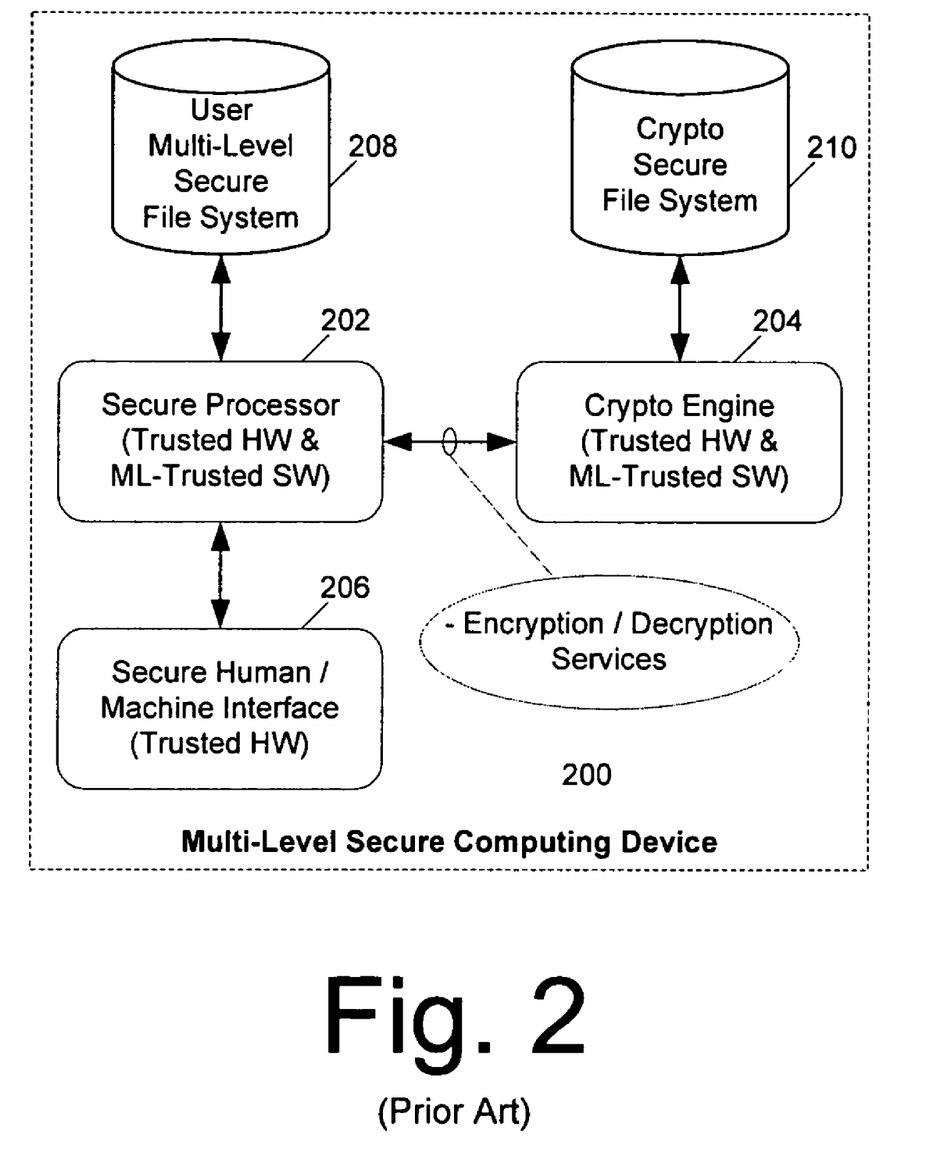
FIG. 2 is a block diagram of a multi-level secure computing device of the prior art.

Referring now to FIG. 2, there is shown a multi-level secure (MLS) computing device 200. MLS computing device 200 can include a secure user processor 202 comprised of trusted hardware and multi-level trusted software (operating system and application software). A secure human/machine interface (HMI) 206 is also provided for the MLS computing device 200. The secure human/machine interface can be similar to the secure HMI described above relative to FIG. 1.

The MLS computing device 200 also includes a user MLS file system 208 in a data store that is used for storing user executable programs and data. Classified data stored in the MLS file system 208 is stored in an encrypted format. A cryptographic engine 204 is provided with trusted hardware and multi-level trusted software for providing encryption and decryption services. A crypto MLS file system 210 is used to store classified data and files used by the cryptographic engine 104. For example, the MLS file system can separately store and control access to data that is designated as Classified, Secret, or Top Secret. In contrast to the user MLS file system 208, user data and applications are not generally stored in the crypto MLS file system 210. Instead, the crypto MLS file system 210 generally contains cryptographic algorithms, security keys, and application data that is specific to the processing performed by the cryptographic engine 204.

Encrypted files in the user MLS files system 208 are accessed by the secure user processor 202 and provided to the cryptographic engine 204 for decryption. After the file has been decrypted, the cryptographic engine passes the decrypted file back to the secure user processor 202. Upon completion of any necessary user processing associated with the decrypted classified date file, the secure user processor 202 passes the file back to the cryptographic engine 204 for re-encryption. Thereafter, the encrypted file is returned to the secure user processor 202, which stores the file in the user MLS file system 208.

The secure user processor 202 can generally satisfy the security requirements for accessing the multi-level secure user file system 208. However, the operating system and applications can be expensive as compared to COTS systems. In particular, the secure user processor must be developed specifically to include trusted software for managing multiple levels of classified files, and especially for managing encryption and decryption services provided by the cryptographic processor. Another disadvantage of this arrangement is that the user multi-level secure user file system 208 is not generally designed to physically secure the data and zeroize the data upon tamper detection.

Figure 3:
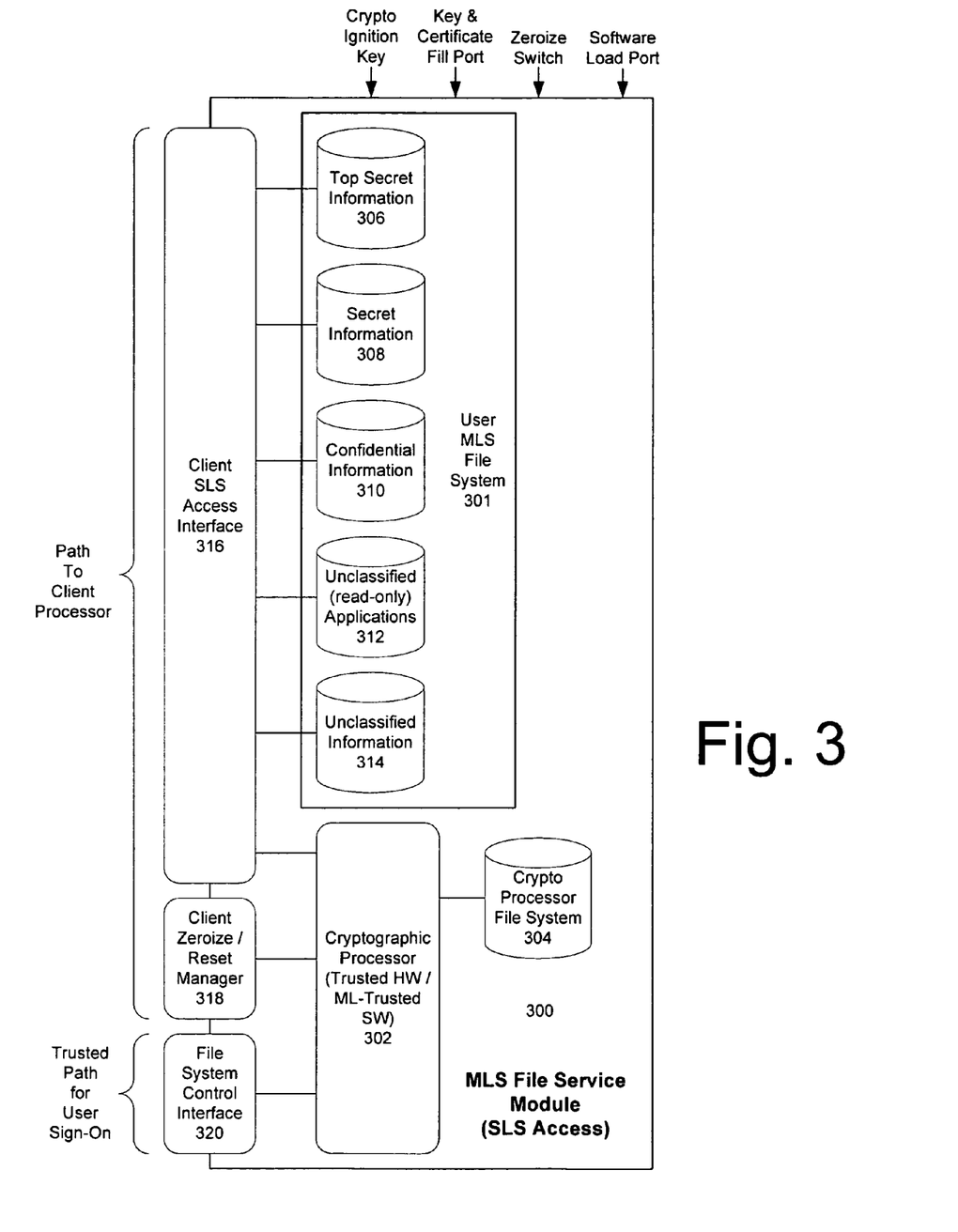
FIG. 3 is a detailed block diagram of a multi-level secure file service module configured for single-level secure file access.

Referring now to FIG. 3, there is shown a detailed block diagram of an MLS file service module 300. The MLS file service module 300 is configured for providing SLS file access to a user MLS file system. As shown in FIG. 3 a cryptographic processor 302 can host a crypto processor file system 304. The crypto processor file system 304 can provide storage for various file used by the cryptographic processor 304. For example, these files can include cryptographic algorithms, keys and certificates, audit data, and policy profiles. The cryptographic processor 302 can also host a user MLS file system 301 comprised of classified information at multiple classification levels. More particularly, the cryptographic processor 302 can provide SLS file access to the MLS file system. Thus, the cryptographic processor 302 can serve files at a single defined security level to a client/user that has signed on at that particular security level after appropriate authentication. Additionally, the cryptographic processor 302 can ensure that information loaded into the MLS file system has been provided by a trusted source and that the integrity of the information has been checked. For example, this can be accomplished using checksum/hashing technology.

According to one embodiment of the invention, the user MLS file system 301 can include files comprising Top Secret information 306, Secret information 308, and Confidential information 310. The files comprising Top Secret information 306, Secret information 308, and Confidential information 310 are stored in an encrypted form. These files can include classified data and classified applications. The classified information files stored in the user MLS file system 301 can be decrypted by the secure cryptographic processor 302 and served to a client processor using client SLS access interface 316. In the opposite direction, classified information processed by the client processor is presented by means of client SLS access interface 316 to the cryptographic processor 302. The cryptographic processor 302 encrypts the classified data file and stores it in the classified section of the user MLS file system 301 as Top Secret information 306, Secret information 308, or Confidential information 310. In this way, the MLS file service module with SLS access 300 can provide a client processor with unencrypted read/write access to such files at a single security classification level after user authentication.

The user MLS file system 301 can also be comprised of unclassified applications 312. Such applications can be stored in a non-encrypted format. Since a user will not normally need to modify applications software, the cryptographic processor 302 can limit access by a client processor so that the client processor is permitted read only access to the files comprising unclassified applications 312. The files included in the unclassified applications 312 can be read by the secure cryptographic processor 302 and served to the client processor through client SLS access interface 316.

The user MLS file system 301 can also contain files comprising unclassified information 314. The files comprising unclassified information 314 stored in the user MLS file system 301 can be read by the secure cryptographic processor 302 and served to the client processor by means of client SLS access interface 316. In the opposite direction, unclassified information processed by the client processor is presented through client MLS access interface 316 to the cryptographic processor 302 for storage in the unclassified section 316 of the user MLS file system. The MLS file service module with SLS access 300 can provide read/write access to files comprising unclassified information 314.

Significantly, the MLS file service module 300 can also include client zeroize/reset manager 318. The client zeroize/reset manager 318 can be controlled by cryptographic processor 302. The cryptographic processor can be programmed to cause the client zeroize/reset manager 318 to automatically zeroize and/or reset any data stores associated with the client processor served by the MLS file service module 300. The client zeroize/reset manager can zeroize or reset any memory devices or data stores used by the client processor to temporarily store application data, user data, or other file data served to the client processor by the MLS file service module 300. As will be appreciated by those skilled in the art, such memory devices can include RAM, DRAM, flash memory, video display buffers and any other memory devices used by the client processor for temporarily storing data from files served by the MLS file service module 300. This automatic process can occur each time that a client processor is transitioned from accessing files at one security classification level to another security classification level.

For example, an SLS client processor served by the MLS file service module 300 can be provided with SLS file-access to Top Secret Information 306. Such access can occur after user sign-on and authentication as appropriate for that security level. Thereafter, a user wishing to use the same SLS client processor to access files at a different defined security classification level can log off the MLS file service module 300. Once logged off, the user can log back on to the MLS file service module 300 with the client processor at a different single defined security classification level. For example, after logging off from the Top Secret level, the client processor can subsequently be permitted access to files comprising a single security classification level such as Secret Information 308, Confidential Information 310, or Unclassified Information 314.

Those skilled in the art will appreciate that a client SLS processor of the prior art is normally only able to access classified information at one level. Such SLS processors and their associated software are not designed to accommodate the security demands for handling files at multiple security classification levels. In contrast, an SLS client processor served by the MLS file service module 300 is now also able to access information at multiple levels of security classification without the possibility of access violation. An example of such an access violations might include a user attempting to downgrade the security level of information contained in files. In particular, a user who accessed files using the client processor and defined as Top Secret Information 306 could maliciously or unintentionally subsequently try to store such data as Classified Information 310. Alternatively, such a situation could arise if information from files defined as Classified Information 310 were written unencrypted to the Unclassified Information 314 storage area. SLS processors are not generally designed to address these issues. However, this problem is solved by using the MLS file service module 300 described herein to provide SLS file access.

Referring again to FIG. 3, the cryptographic processor 302 can be one of several commercially available cryptographic engines. According to one embodiment, the cryptographic processor can be a Sierra II Crypto processor available from Harris Corporation of Melbourne, Fla. The cryptographic processor 302 can include configurable key lengths and can be programmed with one or more encryption algorithms. As illustrated in FIG. 3, the MLS file service module 300 can include several control and data ports that are useful for controlling the operation of the cryptographic processor 302. For example, these can include a crypto ignition key port, a key and certificate fill port, a zeroize switch, and a software load port. The software load port can be used for loading software from a trusted source for executing on the cryptographic processor 302 or a client processor. The zeroize switch can be used to clear the encryption keys and/or the classified information contained in the user MLS file system and the crypto MLS file system 304. The various control and data ports can be controlled by the client processor or by any other suitable means.

The cryptographic processor 302 can include one or more security features. For example, in addition to controlling SLS access to an MLS file system, the cryptographic engine 302 can provide security auditing, security policy enforcement, file integrity checking and/or trusted boot software loading.

The client SLS access interface 316 can provide communications support for a communication path between the MLS file service module 300 and a client processor. Any suitable physically-secure data communication path can be used for this purpose. Requests from a client processor for access to files and the decrypted data files can be communicated over this interface. A file system control interface 320 can be provided for user authentication, sign on, and sign off. This interface can provide a trusted communication link with the client processor.

Figure 4:
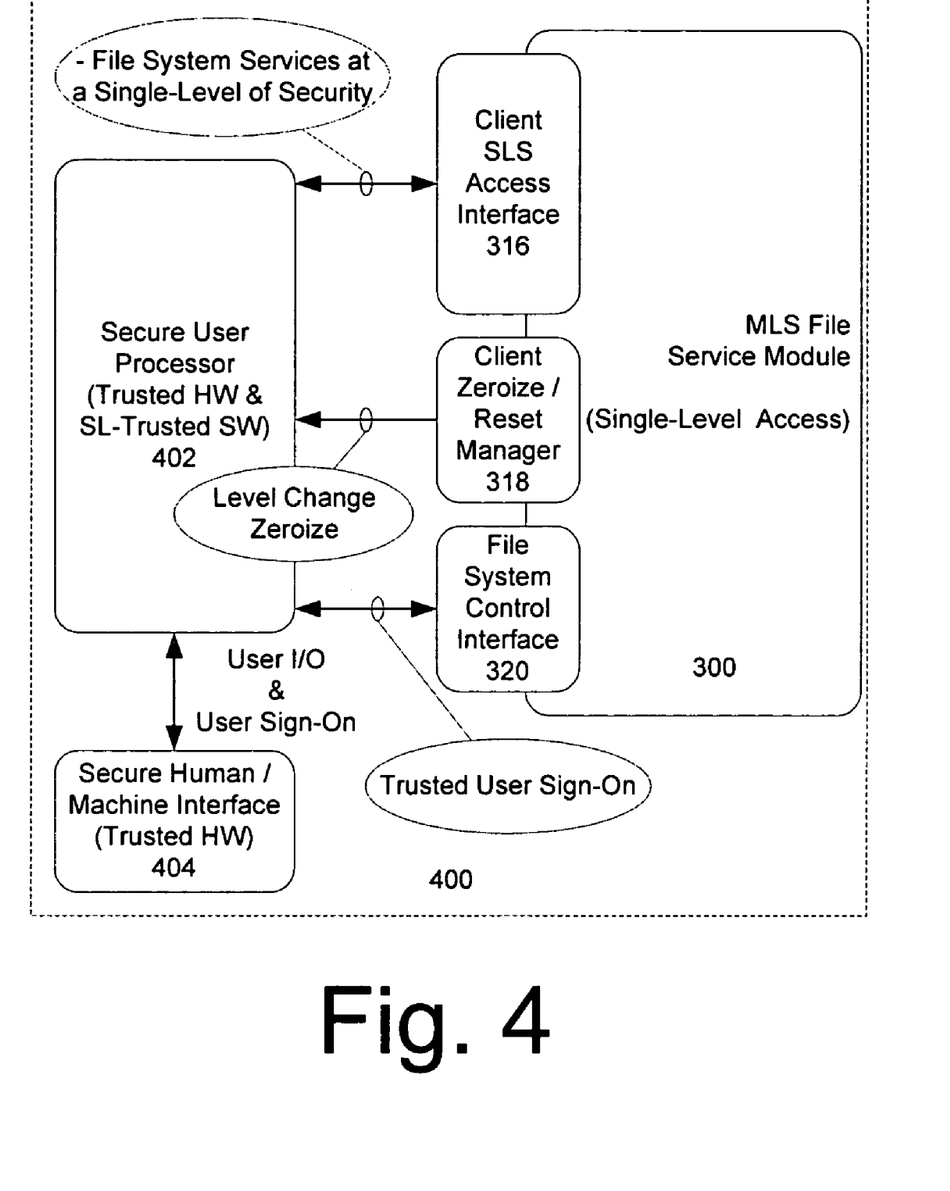
FIG. 4 is a block diagram of a multi-level secure computing architecture that utilizes the file service module of FIG. 3.

Referring now to FIG. 4, there is shown a block diagram for one embodiment of a computer architecture for a multi-level secure computing device 400 with an embedded MLS file service 300 module. SLS computing device 400 includes a secure user processor 402 utilizing trusted processing hardware and single level (SL) trusted software (operating system and application software). A secure HMI 404 is also provided. The secure HMI 404 is comprised of trusted hardware. Secure HMI 404 interfaces with the secure user processor 402 by means of a trusted communication link. Any suitable physically-secure data communication path can be used for this purpose provided that it offers trusted communications between the secure user processor 402 and the secure HMI 404. This trusted communication link can be used for communicating user commands, data, and any information to be displayed on the secure HMI. It can also be used to facilitate user sign-on as hereinafter described. Trusted communication links as described herein are known in the art.

The secure user processor 402 also communicates with the MLS service module 300. In particular, the secure user processor 402 can communicate with the client SLS access interface 316 and the file system control interface 320. The client SLS access interface 316 provides services as described above. The file system control interface 320 can provide a path for trusted user sign-on and authentication for user access to the SLS file access provided by MLS file service module 300. Trusted paths for user sign-on and authentication as referenced herein are known in the art.

The architecture in FIG. 4 provides additional capabilities as compared to the prior art SLS computing device 100 shown in FIG. 1, thereby overcoming several of its limitations. The single-level trusted software running on secure user processor 402 is much simpler and thus less expensive to design, develop, and test/certify as compared to the SL-trusted software required for the secure user processor 102 in computing device 100. The SL-trusted operating system utilized on secure user processor 402 does not need to implement a trusted file system which is normally a significant portion of the SL-trusted OS development effort. The SL-trusted software applications utilized on secure user processor 402 do not need to invoke decryption services upon file read from the file system and do not need to invoke encryption services upon file write to the file system. The absence of these requirements significantly reduces the design, development and testing/certification effort for those software applications.

In addition to the foregoing advantages, the secure user processor 402 can now be used to access files at multiple security classification levels. Such SLS access to the user MLS file system 301 is advantageously achieved by placing responsibility for MLS security with the MLS file service module, and more particularly, with the cryptographic processor 302. Cryptographic processor selectively controls the client zeroize/reset manager 316 to ensure that MLS file system data is zeroized in the client processor whenever the client processor transitions between accessing files at one security classification level versus files at another security classification level. This is a significant improvement over the capabilities and design efficiencies offered by existing architectures.

It is noted that although the software executing on secure user processor 402 is simpler and potentially less expensive than the software utilized by the secure user processor 102 in the prior art, the software executing on secure user processor 402 still needs to be designed, developed, and tested/certified to single-level secure standards. The software on secure user processor 402 still needs to be SL-trusted so that it can provide the trusted path to the file system control interface 320 to support trusted user sign-on services.

Figure 5:
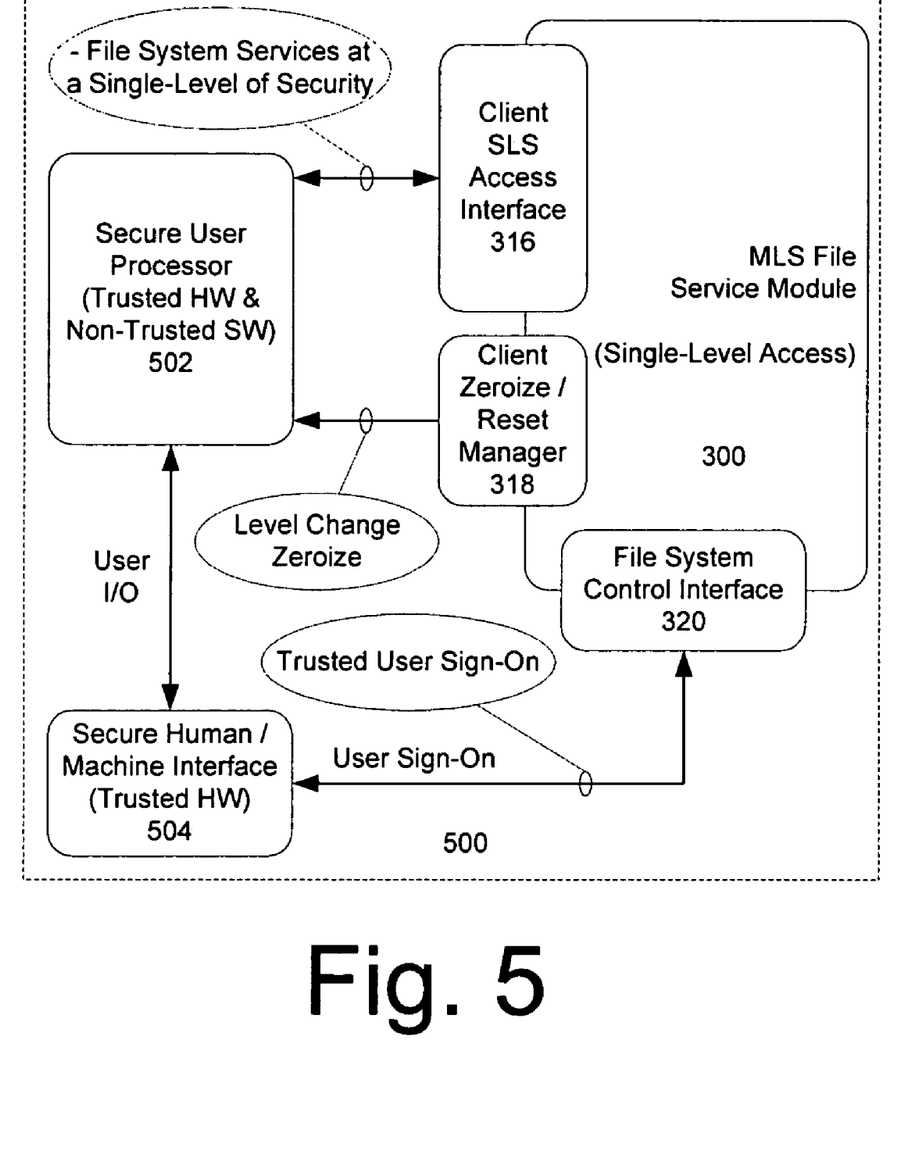
FIG. 5 is an alternative embodiment of a multi-level secure computing architecture that utilizes the file service module of FIG. 3.

Referring now to FIG. 5, there is shown a block diagram for another embodiment of a computer architecture for a multi-level secure computing device 500 with an embedded MLS file service module 300. MLS computing device 500 includes a secure user processor 502 utilizing trusted processing hardware. However, rather than using SL trusted software, non-trusted software (operating system and application software) is used instead. For example, COTS software can be used for this purpose.

A secure HMI 504 is also provided. The secure HMI 504 is comprised of trusted hardware. Secure HMI 504 interfaces with the secure user processor 502 by means of a physically-secure communication link. Any suitable physically-secure data communication path can be used for this purpose. This physically-secure data communication link can be used for communicating user commands, data, and any information to be displayed on the secure HMI. Notably, in the architecture shown in FIG. 5, this physically-secure communication link is not used to facilitate user sign-on because the software utilized by secure user processor 502 is not trusted. Instead, a separate trusted communication link is provided directly between the secure HMI 504 and the file system control interface 320.

The secure user processor 502 also communicates with the MLS service module 300. In particular, the secure user processor 502 can communicate with the client SLS access interface 316 (but not the file system control interface 320). The client SLS access interface 316 provides services as described above.

The architecture in FIG. 5 provides the same capabilities as the SLS computing device 400 shown in FIG. 4, while overcoming one of its major limitations. In contrast to the device 400, the software running on secure user processor 502 is COTS software that is highly familiar to the user and does not require expensive custom development. The tradeoff to this approach is that secure user processor 502 cannot provide the trusted path to the file system control interface 320 to support trusted user sign-on services. Referring to FIG. 5, it is seen that trusted human/machine interface 504 must now support two separate interfaces, one trusted interface to the SLS file service module 300 to handle user authentication and a second physically-secure interface to secure user processor 502 for all normal user input/output such as running software applications. This can permit a user to use familiar COTS operating systems and applications installed on the secure user processor 502, while still having the benefit of access to the MLS file service module 300.

In FIGS. 4 and 5 a communication link is provided respectively between the secure user processor 402, 502 and an SLS access interface 316 associated with a MLS file service module 300. It should be understood that the foregoing communication link can be implemented by any suitable means and in different physical configurations, provided it is physically secure. For example, the data communication link can be through a direct connection (e.g. USB, PCMCIA) interface. Such a direct connection can create the appearance that the MLS file service module 300 is a local disk drive. However, in order to establish a trusted path for user sign-on/sign-off, suitable trusted path methods can be used to provide the communication link. Trusted path methods of this type are well known to those skilled in the art.

As an alternative to the direct connection approach described above, the MLS file service module 300 can be embedded in the computer on an I/O bus (e.g. PCI) to provide the appearance of a local disk drive, but within the same physically secure enclosure. In this way, a secure path can be provided between the secure user processor and the file service module. Yet another alternative can include embedding the MLS file service module 300 on a host computer motherboard. Consequently, the data communication can occur over a data communication link within the same physically secure enclosure to establish a secure path.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for providing a secure file service, comprising:
   receiving at a multi-level secure (MLS) file service module a request from a single level secure (SLS) user processor for a classified user data file of a first security classification level, said classified user data file exclusively comprising at least one of user data and a user software application;
   responsive to said request, accessing with a cryptographic processor an MLS file system containing said classified user data file;
   decrypting said classified user data file with said cryptographic processor;
   communicating, from said cryptographic processor, said classified user data file to said SLS user processor in decrypted form;
   transitioning said SLS user processor from accessing classified user data files of said first security classification level to accessing user data files of a second security classification level contained in said MLS file system; and
   in response to said transitioning of said SLS user processor, automatically erasing said classified user data file from at least one memory device used by said SLS user processor to temporarily store at least one of said user data and said user software application served to said SLS user processor by said MLS file service module; and
   wherein said first and second security classification levels specify which classes of persons have access rights to respective ones of said user data files.

2. The method according to claim 1, further comprising selecting said cryptographic processor to include one or more hardware based encryption services that facilitate the encryption and decryption of classified data files.

3. The method according to claim 2, further comprising selecting said hardware based encryption services from the group consisting of a hardware implemented cryptographic algorithm, a random number generator, and an exponentiator.

4. The method according to claim 1, further comprising exclusively limiting concurrent access of said SLS user processor to files defined within a single security classification level within said MLS file system.

5. The method according to claim 4, wherein said automatic erasure is controlled by said cryptographic processor.

6. The method according to claim 1, further comprising communicating said classified user data file from said MLS file service module to said SLS user processor over a secure path.

7. The method according to claim 1, further comprising generating said request for said classified user data file at a secure human/machine interface and communicating said request to said SLS user processor.

8. The method according to claim 1, further comprising, displaying information contained in said classified user data file to a user with said secure human/machine interface.

9. The method according to claim 1, further comprising:
   communicating said classified user data file from said SLS user processor to said MLS file service module;
   encrypting said classified user data file using said cryptographic processor; and
   accessing said MLS file system using said cryptographic processor to store said classified user data file after encryption in said MLS file system.

10. The method according to claim 1, further comprising, authenticating a user to said cryptographic processor by communicating at least one user authentication information to said cryptographic processor.

11. The method according to claim 1, further comprising:
    receiving at said MLS file service module a request from said SLS user processor for a non-encrypted unclassified data file;
    responsive to said request, accessing with said MLS file system containing said unclassified data file; and
    serving said unclassified data file to said SLS user processor in plain-text form.

12. The method according to claim 1, further comprising selecting said cryptographic processor to include a trusted microprocessor and a trusted operating system executing on said trusted cryptographic processor.

13. The method according to claim 1, further comprising selecting said SLS user processor to include a trusted microprocessor hardware.

14. The method according to claim 13, further comprising selecting said SLS user processor to include a single level trusted operating system.

15. The method according to claim 13, further comprising selecting said SLS user processor to include an untrusted operating system.

16. A system for providing a secure file service, comprising:
    a multi-level secure (MLS) file service device comprising a cryptographic processor for
    encrypting and decrypting a classified user data file;
    an MLS file system hosted by said cryptographic processor containing classified user data files and accessible exclusively to said cryptographic processor; and
    wherein said cryptographic processor comprises processing means responsive to a single level secure (SLS) user processor that is distinct from said cryptographic processor for accessing at least one classified user data file of a first security classification level from said secure file system, said classified user data file exclusively comprising at least one of user data and a user software application,
    decrypting said classified user data file,
    communicating, from said cryptographic processor, said classified user data file to said SLS user processor in decrypted form, and
    automatically causing an erasure of said classified user data file from at least one data store used by said SLS user processor to temporarily store at least one of said user data and said user software application, in response to a transition of said SLS user processor from accessing said classified user data file of said first security classification level to accessing at least one user data file of a second security classification level;
    and wherein said first and second security classification levels specify which classes of persons have access rights to respective ones of said user data files.

17. The system according to claim 16, wherein said cryptographic processor further comprises one or more hardware based encryption services that facilitate the encryption and decryption of classified data files.

18. The system according to claim 17, wherein said hardware based encryption services are selected from the group consisting of a hardware implemented cryptographic algorithm, a random number generator, and an exponentiator.

19. The system according to claim 16, wherein said cryptographic processor exclusively limits said SLS user processor file access so that said SLS user processor can concurrently access only files defined within a single security classification level within said MLS file system.

20. The system according to claim 19, further comprising a client zeroizer responsive to said cryptographic processor, said client zeroizer configured for automatically zeroizing said data store used by said SLS user processor.

21. The system according to claim 16, further comprising a secure path defining a data communication link between said SLS user processor and said cryptographic processor.

22. The system according to claim 16, further comprising a secure human/machine interface operatively connected to said SLS user processor configured for communicating user commands to said SLS user processor and for displaying classified data files.

23. The system according to claim 16, wherein said SLS user processor further comprises processing means for communicating said classified user data file from said SLS user processor to said cryptographic processor.

24. The system according to claim 23, wherein said cryptographic processor further comprises processing means for encrypting said classified user data file, and for accessing said MLS file system with said cryptographic processor to store said classified user data file after encryption in said MLS file system.

25. The system according to claim 16, wherein at least one of said SLS user processor and said cryptographic processor further comprises processing means for authenticating a user responsive to at least one user authentication information.

26. The system according to claim 16, wherein said cryptographic processor further comprises means for accessing said MLS file system responsive to a request from said SLS user processor for an unclassified data file, and means for serving said unclassified data file to said SLS user processor.

27. The system according to claim 16, wherein said cryptographic processor is comprised of a trusted microprocessor and a trusted operating system executing on said trusted cryptographic processor.

28. The system according to claim 16, wherein said SLS user processor include a trusted microprocessor hardware.

29. The system according to claim 28, wherein said SLS user processor is comprised of a single level trusted operating system.

30. The system according to claim 28, wherein said SLS user processor comprises an untrusted operating system.

31. A multi-level secure (MLS) file services system, comprising:
an MLS file services device including
a cryptographic processor,
a MLS file system,
a client access interface configured to serve classified user data files stored in said MLS file system to a single level secure (SLS) client processor after decryption by said cryptographic processor, to receive said classified user data files from said SLS client processor, and to store said classified user data files in said MLS file system after encryption by said cryptographic processor,
a file system control interface, configured for authenticating a user prior to said client access interface serving classified user data files to said SLS client processor, and
a client zeroize/reset manager configured to automatically erase said classified user data files from a data store used by said SLS client processor for temporary storage of said classified user data files served by said client access interface when said SLS client processor transitions from accessing user files of a first security classification level to accessing user files of a second security classification level contained in said MLS file system, said user files exclusively comprising at least one of user data and a user software application;
wherein said first and second security classification levels specify which classes of persons have access rights to respective ones of said user data files.

32. The MLS file services system according to claim 31, further comprising a physically-secure data communication path for communicating said classified user data files between said client access interface and said SLS client processor.

33. The MLS file services module according to claim 32, wherein said physically secure data communication path is provided by co-locating said secure file services module in a physically secure enclosure that also contains said SLS client processor.

34. The MLS file services module according to claim 32, further comprising a trusted path between said file system control interface and a human/machine interface associated with said SLS client processor, said trusted path exclusive of said physically secure data communication path.

35. The MLS file services system according to claim 31, wherein said SLS client processor comprises untrusted software.

* * * * *